US009208690B2

(12) United States Patent
Jonsson (10) Patent No.: US 9,208,690 B2
(45) Date of Patent: *Dec. 8, 2015

(54) CALCULATING TIME TO GO AND SIZE OF AN OBJECT BASED ON SCALE CORRELATION BETWEEN IMAGES FROM AN ELECTRO OPTICAL SENSOR

(71) Applicant: SAAB AB, Linköping (SE)

(72) Inventor: Jimmy Jonsson, Linköping (SE)

(73) Assignee: SAAB AB, Linköping (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/289,201

(22) Filed: May 28, 2014

(65) Prior Publication Data

US 2014/0278048 A1 Sep. 18, 2014

Related U.S. Application Data

(63) Continuation of application No. 13/257,416, filed as application No. PCT/SE2009/050279 on Mar. 18, 2009, now Pat. No. 8,774,457.

(51) Int. Cl.
*G06K 9/00* (2006.01)
*G08G 5/04* (2006.01)
*G08G 5/00* (2006.01)

(52) U.S. Cl.
CPC ............ *G08G 5/045* (2013.01); *G06K 9/00805* (2013.01); *G08G 5/0021* (2013.01)

(58) Field of Classification Search
CPC ....... G06K 9/00; G08G 5/045; G08G 5/0021; G08G 5/003
USPC ......... 382/100, 103, 106–107, 121, 165, 181, 382/211; 348/152, 154–155, 169, 170–172, 348/208.1, 208.2, 208.14–208.16, 352–353, 348/465, 558; 715/250, 862
See application file for complete search history.

(56) References Cited

U.S. PATENT DOCUMENTS 5,150,426 A * 9/1992 Banh et al. .................... 382/103
5,960,097 A * 9/1999 Pfeiffer et al. ................ 382/103
(Continued)

FOREIGN PATENT DOCUMENTS

WO WO-00/27131 A2 5/2000

OTHER PUBLICATIONS

PCT/ISA/210—International Search Report—Nov. 4, 2009.
(Continued)

*Primary Examiner* — Hadi Akhavannik
(74) *Attorney, Agent, or Firm* — Venable LLP; Eric J. Franklin (57) ABSTRACT

A method for calculating a Time To Go value between a vehicle and an intruding object. First and second images of the object are retrieved at first and second points of time. A scaling factor is selected and the second image scaled with the scale factor. The scaled image is resampled to a set position. Correlation values are calculated between the first image and the resampled scaled image for different horizontal displacements and/or different vertical displacements for the resampled scaled image. A maximum correlation value is found based on the correlation values. Selecting the scaling factor, resampling, calculating the correlation values, and finding the maximum correlation values are repeated a second predetermined number of times. A largest maximum correlation value is found among the maximum correlation values and the scale factor associated with the largest maximum correlation value. The Time To Go is calculated based on the associated scale factor.

24 Claims, 4 Drawing Sheets

(56) References Cited

U.S. PATENT DOCUMENTS

| | | | |
|---|---|---|---|
| 6,144,366 A * | 11/2000 | Numazaki et al. | 345/156 |
| 6,909,802 B2 * | 6/2005 | Nakamura | 382/154 |
| 7,526,100 B1 * | 4/2009 | Hartman et al. | 382/103 |
| 7,817,185 B2 * | 10/2010 | Kurata | 348/208.1 |
| 8,178,825 B2 * | 5/2012 | Goossen et al. | 244/3.14 |
| 8,229,163 B2 * | 7/2012 | Coleman et al. | 382/103 |
| 8,611,600 B2 * | 12/2013 | Newman et al. | 382/103 |
| 2004/0125207 A1 | 7/2004 | Mittal et al. | |
| 2005/0129316 A1 * | 6/2005 | Curti et al. | 382/224 |
| 2005/0271300 A1 * | 12/2005 | Pina | 382/294 |
| 2006/0149458 A1 * | 7/2006 | Costello et al. | 701/200 |
| 2010/0004861 A1 * | 1/2010 | Park et al. | 701/301 |
| 2013/0094694 A1 * | 4/2013 | Newman et al. | 382/103 |

OTHER PUBLICATIONS

PCT/ISA/237—Written Opinion of the International Searching Authority—November 4, 2009.

Kazuaki Kondo et al; "Non-isotropic Omnidirectional Imaging System for an Autonomous mobile Robot"; 2005 IEEE; pp. 1228-1233, col. 1, line 4-line 24.

Michael E. Brauckmann et al; "Towards All around Automatic Visual Obstacle Sensing for Cars"; IEEE, Oct. 2004; pp. 79-84.

* cited by examiner

CALCULATING TIME TO GO AND SIZE OF AN OBJECT BASED ON SCALE CORRELATION BETWEEN IMAGES FROM AN ELECTRO OPTICAL SENSOR

CROSS-REFERENCE TO RELATED APPLICATIONS

This application is a continuation of co-pending U.S. patent application Ser. No. 13/257,416 filed 19 Sep. 2011, which was the national phase under 35 U.S.C. §371 of PCT/SE2009/050279 filed 18 Mar. 2009.

TECHNICAL FIELD

The present invention relates to the field of sense and avoid for a vehicle, and more particularly to a system and a method for calculating time to go, between a vehicle and an intruding object, and the size of the intruding object.

BACKGROUND

In order to allow unmanned aerial vehicles (UAVs) to travel in civil unsegregated airspace, several technical problems must be solved. One of the most important issues is the "sense & avoid" problem: a UAV must be able to sense the presence of other aerial vehicles or objects, and if necessary, perform an autonomous and safe last instant maneuver to avoid collision. Therefore, a UAV typically comprises an air collision avoidance system, sometimes also referred to as a Sense & Avoid system. The Sense & Avoid system includes one or several sensors for sensing intruding aircrafts or objects, and collision avoidance functionality that uses the sensed data to perform a safe escape maneuver. Since the collision avoidance system is a safety enhancing system it is crucial that the data supplied to the collision avoidance functionality are of high quality in order to avoid nuisance and unsafe maneuvers.

A crucial parameter in a collision avoidance system is an entity called Time To Go (TTG), which is the calculated time to go before collision with an intruding other aerial vehicles or object. The TTG can be calculated based on data regarding the own aircraft's position and motion and data on surrounding objects, collected by the sensors of the collision avoidance system.

There are several known ways of estimating the time to go before collision with intruding aircrafts or objects. For example, it is known to use cameras for capturing consecutive images of intruding aircrafts or objects such that the aircraft or object represent themselves as target points in the images. The TTG can then be estimated based on the scale change between the target points from one image to another.

It is also well-known in the art to use different types of tracking filters adapted to estimate the time to go with a nearby aircraft from a sequence of observations about the nearby aircraft's position, typically acquired by means of radar.

However, each of the above principles for estimating time to go suffers from drawbacks. The first principle according to which time to go estimates are calculated based on scale change between target points in consecutive images suffers from the drawback that the uncertainty in the time to go estimates are high. The second principle in which time to go estimates are estimated by a tracking filter also suffers from the drawback that the uncertainty in the time to go estimates are high.

SUMMARY

It is thus an object of the present invention to be able to calculate the time to go between a vehicle and an intruding aerial vehicle or object with a high degree of certainty.

According to a first aspect of the preset invention this object is achieved by a method for calculating a Time To Go, TTG, value between a vehicle and an intruding object, said method comprising the steps of:

retrieving a first image of said intruding object at a first point of time, $T_0$, and a second image of said intruding object at a second point of time, $T_1$;

filtering said first image and said second image so that said first image and said second image become independent of absolute signal energy and so that edges become enhanced;

setting an X fractional pixel position, $X_{FRAC}$, to zero and an Y fractional pixel position, $Y_{FRAC}$, to zero, where $X_{FRAC}$ denotes a horizontal displacement at sub pixel level and $Y_{FRAC}$ a vertical displacement at sub pixel level; selecting a scale factor, $S_i$;

scaling said second image with said scale factor, $S_i$, and resampling said scaled image to position $X_{FRAC}$ and $Y_{FRAC}$; resulting in a resampled scaled image, $RS_iI$;

calculating correlation values, $C_{XPIX, YPIX, i}$, between said first image and said resampled scaled image, $RRS_iI$, for different horizontal displacements at pixel level, $X_{PIX}$, and different vertical displacements at pixel level, $Y_{PIX}$, for said resampled scaled image $RS_iI$;

finding a maximum correlation value at subpixel level, $C_i$, based on said correlation values, $C_{XPIX, YPIX, i}$, and updating $X_{FRAC}$ and $Y_{FRAC}$;

setting j=j+1 and repeating steps S46 to S49 a first predetermined number of times;

setting i=i+1 and repeating steps S45 to S50 a second predetermined number of times;

finding a largest maximum correlation value, $C_{MAX}$, among said maximum correlation values, $C_i$, and the scale factor $S_{i, MAX}$ associated with the largest maximum correlation value $C_{MAX}$; and calculating the Time To Go, TTG, based on said scale factor $S_{i, MAX}$ According to a second aspect of the present invention the object is achieved by a computer program product for use in a vehicle for calculating a Time To Go, TTG, between said vehicle and an intruding object, comprising a computer readable medium, having thereon: computer readable code means which, when run in a processing means of the vehicle causes the processing means to perform;

retrieving a first image of said intruding object at a first point of time, $T_0$, and a second image of said intruding object at a second point of time, $T_1$;

filtering said first image and said second image so that said first image and said second image become independent of absolute signal energy and so that edges become enhanced;

setting an X fractional pixel position, $X_{FRAC}$, to zero and an Y fractional pixel position, $Y_{FRAC}$, to zero, where $X_{FRAC}$ denotes a horizontal displacement at sub pixel level and $Y_{FRAC}$ a vertical displacement at sub pixel level; selecting a scale factor, $S_i$;

scaling said second image with said scale factor, $S_i$, and resampling said scaled image to position $X_{FRAC}$ and $Y_{FRAC}$; resulting in a resampled scaled image, $RS_iI$;

calculating correlation values, $C_{XPIX, YPIX, i}$, between said first image and said resampled scaled image, $RS_iI$, for different horizontal displacements at pixel level, $X_{PIX}$, and different vertical displacements at pixel level, $Y_{PIX}$, for said resampled scaled image $RS_iI$;

finding a maximum correlation value at subpixel level, $C_i$, based on said correlation values, $C_{XPIX, YPIXi}$, and updating $X_{FRAC}$ and $Y_{FRAC}$;

setting j=j+1 and repeating steps S46 to S49 a first predetermined number of times;

setting i=i+1 and repeating steps S45 to S50 a second predetermined number of times;

finding a maximum correlation value, $C_{MAX}$, among said maximum correlation values, $C_i$, and the scale factor $S_{i,MAX}$ associated with said maximum correlation value $C_i$; and calculating the Time To Go, TTG, based on said scale factor $S_{i,MAX}$ An advantage with the method and the system according to embodiments of the present invention is that a very accurate value of the scale factor is achieved that is used to calculate time to go.

Another advantage with embodiments of the present invention is that the size of an intruding aerial vehicle or object in an image can be estimated with a high degree of certainty.

More advantageous features of the method and system according to the present invention will be described in the detailed description following hereinafter.

BRIEF DESCRIPTION OF THE DRAWINGS

The invention will in the following be described in more detail with reference to enclosed drawings, wherein.

DETAILED DESCRIPTION

In the following description, for purposes of explanation and not limitation, specific details are set forth, such as particular sequences of steps and device configurations in order to provide a thorough understanding of the present invention. It will be apparent to one skilled in the art that the present invention may be carried out in other embodiments that depart from these specific details.

Moreover, those skilled in the art will appreciate that functions and means explained herein below may be implemented using software functioning in conjunction with a programmed microprocessor or a general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
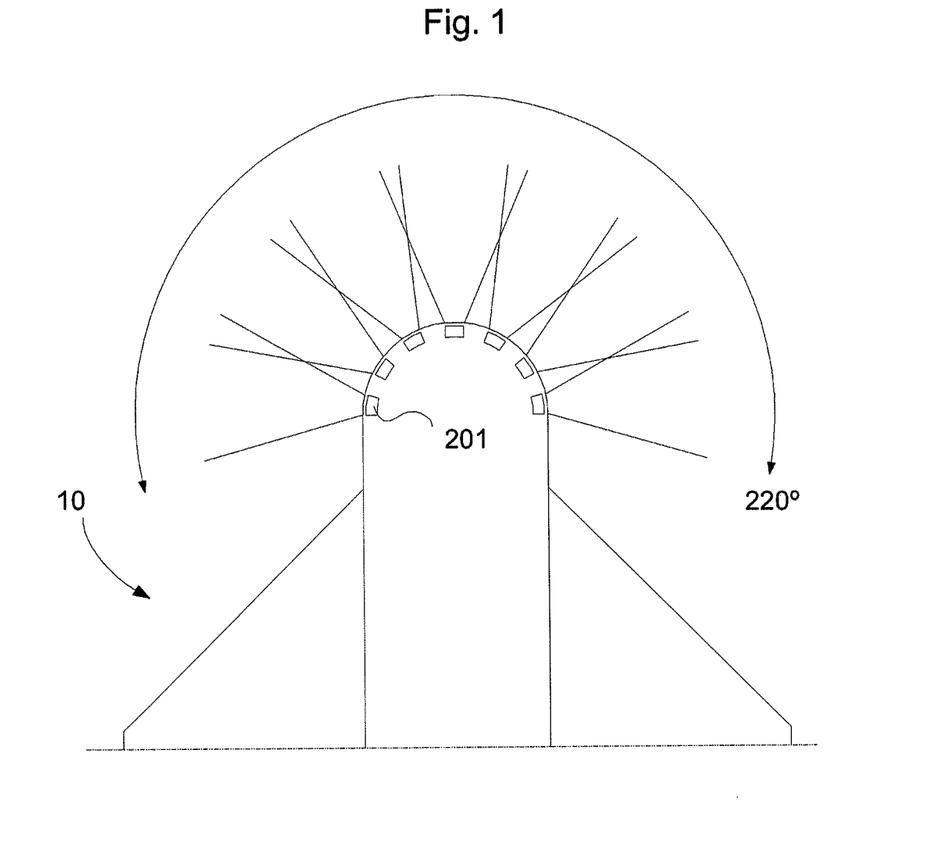
FIG. 1 illustrates a top view of the front half of an Unmanned Aerial Vehicle 10 comprising electro optical sensors used in the present invention.

FIG. 1 illustrates a top view of the front half of an Unmanned Aerial Vehicle (UAV) 10. The UAV 10 comprises one or several electro-optical (EO) sensors 201 for monitoring surrounding air traffic.

In the exemplary embodiment illustrated in FIG. 1, the UAV 10 is seen to comprise seven electro-optical (EO) sensors 201 which are arranged in a semi-circular pattern on or close to the nose of the UAV 10. The EO sensors 201 may be any devices which are able to capture consecutive images of an intruding aerial vehicle or objects in the surrounding airspace. In one embodiment of the invention, the EO sensors 201 are 9 Hz video cameras 201 capturing images having a 2048×2048 pixel resolution. That is, each camera 201 captures nine high-resolution images of the surrounding airspace every second. Each camera 201 has a field of view of 35 degrees in azimuth and 30 degrees in elevation. The fields of view of two adjacent cameras 201 are overlapping slightly in azimuth, resulting in a total field of view of 220 degrees in azimuth for the entire EO sensor arrangement. The EO sensor arrangement thus has a field of view of 220 degrees in azimuth and 30 degrees in elevation, which substantially corresponds to the field of view of the human eyes.

Figure 2:
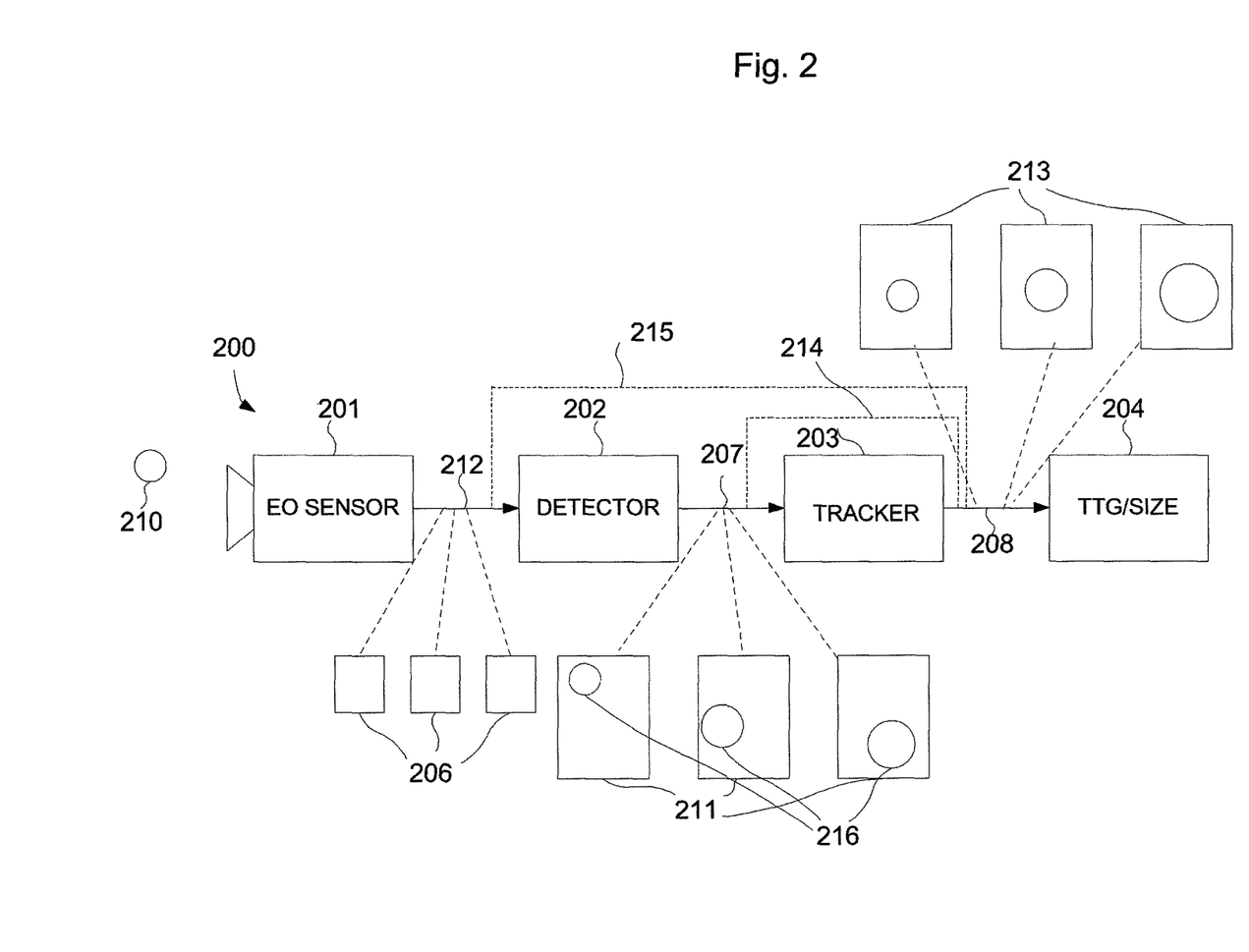
FIG. 2 is a schematic illustration of a system according to embodiments of the present invention for calculating time to go and the size in an image of the intruding aerial vehicle or object

FIG. 2 is a schematic illustration of a system 200 in an Unmanned Aerial Vehicle (UAV) (not shown) for estimating time to go and the size in an image 206, 211, 213 of an intruding aerial vehicle or object 210 according to embodiments of the present invention. In these embodiments the system 200 comprises an electro-optical (EO) sensor 201 as the one described in relation to FIG. 1. As mentioned above the electro-optical sensor 201 produces a first sequence of images 206. An intruding object or aerial vehicle 210 may be present in some or in all images in the first sequence of images 206 depending on among others a position of the intruding aerial vehicle or object 210 in relation to the electro-optical sensor 201. The first sequence of images 206 is provided to a detector 202 via a connection 212 from the electro-optical-sensor 201 to the detector 202. The detector 202 detects intruding aerial vehicles or objects 210 in the first sequence of images 206 taken by the electro-optical sensor 201.

The detector 202 thereby creates a second sequence of images 211 in which the intruding aerial vehicle or object 210 is detected in images 211 in the second sequence of images. As can be seen in FIG. 2 the intruding aerial vehicle or object has 210 has been detected in the second sequence of images 211 as a circle 216 in each image. In this scenario the intruding aerial vehicle 210 is shown at different positions in the second sequence of images 211, which means that the aerial vehicle or object 210 has moved in relation to the Unmanned Aerial Vehicle (UAV). The second sequence of images 211 is delivered to a tracker 201 via a connection 207. The tracker tracks the intruding aerial vehicle or object 210 in the second sequence of images. The tracker thereby creates a third sequence of images 213 in which the intruding aerial vehicle or object 210 is tracked in each image. In embodiments of the invention the tracker centralize the intruding aerial vehicle or object 210 in each image in the third sequence of images 213.

The third sequence of images 213 is delivered to a time to go calculator 204 which calculates the time to go according to embodiments of the invention. The method according to the present invention for calculating time to go will be described further down in relation to FIG. 4. In FIG. 2 the detector and the tracker have been illustrated as two separate units. The detector and/or the tracker may according to embodiments of the invention also be a part of the time to go calculator 204. In embodiments where the tracker is a part of the time to go calculator 204 the second sequence of images 211 is delivered to the time to go calculator via the connection 214. In other embodiments of the invention where both the detector and the tracker are part of the time to go calculator the first sequence of images is delivered to the time to go calculator 204 via the connection 215.

The time to go calculator 204 may also according to embodiments of the invention calculates a size in an image of the intruding aerial vehicle or object.

Note that in embodiments of the invention the second sequence of images comprises coordinates (not shown) of the intruding aerial vehicle or object in each image in the first sequence of images. In yet other embodiments of the invention the third sequence of images comprises coordinates (not shown) of the intruding aerial vehicle or object in each image in the first sequence of images.

Figure 3:
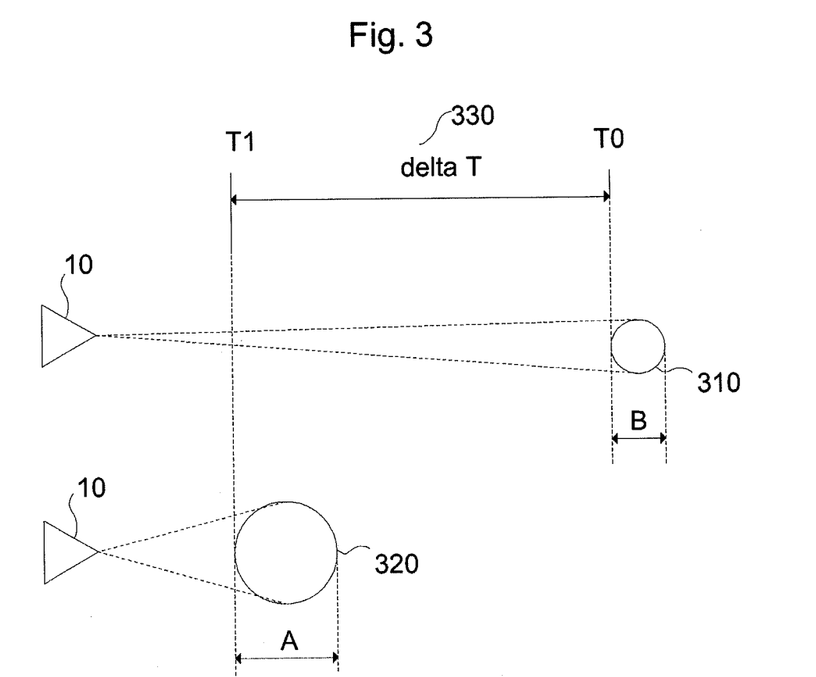
FIG. 3 illustrates a principle used in the present invention for calculating time to go.

Turning now to FIG. 3, which illustrates a principle used in the present invention for calculating time to go. Estimation of time-to-go is done based on a target image 310 of the intruding aerial vehicle or object at a time points $T_0$ and another target image 320 of the intruding aerial vehicle or object at another time point $T_1$.

As can be seen in FIG. 3, a size A of the target image 320 at the time point $T_1$ is bigger than a size B of the target image 310 at the time point $T_0$. This means that the intruding aerial vehicle or object has moved closer to the Unmanned Aerial Vehicle (UAV) 10 from the time point $T_0$ to the time point $T_1$. By measuring a scale change S between the target image 320 and the target image 310 it is possible to estimate the time to go, since a time $\Delta t$ between $T_0$ and $T_1$ is known. In order to estimate the time-to-go a formula (1) may be used.

$$TTG_1 = \frac{\Delta t}{1 - \frac{A}{B}} - \Delta t \quad (1)$$

In the formula (1) the sizes A and B of the target at the time points $T_0$ and $T_1$ shall be estimated. It is however difficult to determine the absolute sizes of the target at these two time points. Consider the division A/B instead. This division is the scale change, S, between the two observations and is more easily estimated than the pure target sizes. The time between $T_0$ and $T_1$, $\Delta t$, is known.

A problem with the principle according to FIG. 3 is that a very exact value of the scale change is required in order to achieve a god estimate of the time to go.

An advantage with the method and the system according to embodiments of the present invention is that a very accurate value of the scale change is achieved that is used to calculate time to go according to the above principle.

Figure 4:
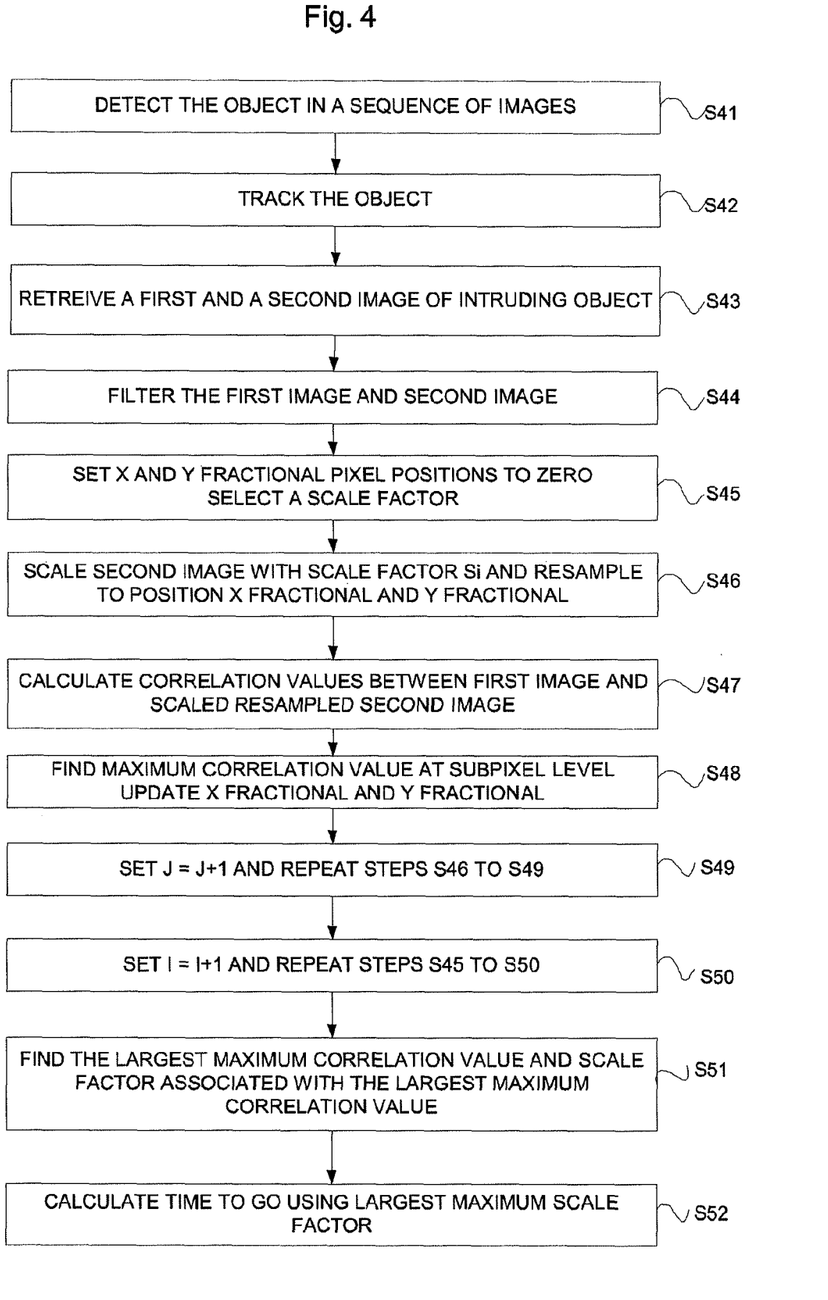
FIG. 4 is a flowchart illustrating embodiments of the method according to the present invention.

FIG. 4 shows a flow chart of the method in a vehicle (not shown) for calculating time to go, according to embodiments of the present invention.

In a first step S41 the detector 202 detects the intruding aerial vehicle or object in the first sequence of images 212 produced by the EO sensor 201. Detection of the intruding aerial vehicle or object in step S41 results in that the detector creates a second sequence of images 211 in which the intruding aerial vehicle or object is detected in each image. An intruding aerial vehicle or object being detected in an image (not shown) in the second sequence of images could for instance mean that the images are associated with coordinates in the images where the intruding aerial vehicle or object is located. Since there are several methods known in the art for detecting objects of certain shapes in images these methods are not further described herein.

Next in a step S42 the tracker tracks the intruding aerial vehicle or object in the second sequence 211 of images from the detector 202. A third sequence of images 213 is thereby created in step S42 by the tracker in which the intruding aerial vehicle or object is tracked in the images. In one embodiment of the invention tracking could for instance mean that the intruding aerial vehicle or object is centralized the images in the third sequence of images. Since tracking an object in consecutive images is well known in the art tracking is not further described herein.

In a next step S43, a first image and a second image of the intruding aerial vehicle of object are retrieved by the time to go calculator 204. The first image of the intruding aerial vehicle or object is an image of the intruding aerial vehicle or object at a first point of time, $T_0$. The second image of the intruding aerial vehicle or object is an image of the intruding aerial vehicle or object at a second point of time, $T_1$. The first and the second images are, according to embodiments of the present invention, retrieved from the first sequence of images 206. In other embodiments of the present invention the first and the second images are retrieved from the second sequence of images 211. In yet other embodiment of the present invention the first and the second images are retrieved from the third sequence of images 213. In embodiments of the invention where the first and the second images are retrieved from the first sequence of images 206, detection and tracking of intruding aerial vehicles or objects are performed in the time to go calculator 204. An advantage with placing the detector and tracker in the time to go calculator is that the system 200 then requires less separate units. In other embodiments of the invention where the first and the second images are retrieved from the second sequence of images 211 tracking of intruding aerial vehicles or objects is performed in the time to go calculator 204. An advantage with placing the tracker in the time to go calculator is that the system 200 then requires less separate units.

The next step performed in the method is step S44 in which the first and the second images are filtered by the time to go calculator 204. Filtering in step S44 results in that the first and second images become independent of absolute signal energy. The filtering in step S44 also results in that edges of the first and second images become enhanced. Filtering of the first and the second images are necessary operations to achieve accurate values in the correlation operations, which will be described further down.

After step S44 an X fractional pixel position, $X_{FRAC}$, is set to zero and a Y fractional pixel position, $Y_{FRAC}$, is set to zero in step S45. The $X_{FRAC}$ denotes a horizontal displacement at sub pixel level and $Y_{FRAC}$ a vertical displacement at sub pixel level. A scale factor, $S_i$, is also selected in step S45. Next is the second image scaled with the scale factor, $S_i$, and resampled to position $X_{FRAC}$ and $Y_{FRAC}$ in step S46. This results in a resampled scaled image, $RS_iI$. Correlation values, $C_{XPIX,\ YPIX,\ i}$, between the first image and the resampled scaled image, $RS_iI$, are next calculated in step S47. The correlation values in step S46 are calculated for different horizontal displacements at pixel level, $X_{PIX}$, and different vertical displacements at pixel level, $Y_{PIX}$, for the resampled scaled image $RS_iI$. The correlation values between the first image and the resampled scaled image, $RS_iI$, calculated in step S47, describes how similar the first and the resampled scaled image $RS_iI$ are for different displacements of the resampled scaled image $RS_iI$. There are many different methods for calculating a correlation between two images known in the art. Therefore these methods are not further described herein.

It is not sure that the maximum correlation value between the first image and the resampled scaled second image $RS_iI$ can be found among the correlation values calculated in step S47. The maximum correlation value between the first image and the resampled scaled image might be in a position where the resampled scaled image $RS_iI$ has been displaced a fraction of a pixel in vertical or horizontal direction. In step S48 the maximum correlation value is therefore found at subpixel level which is necessary in order to find the scale factor that gives the best correlation between the first image and the resampled scaled image.

The maximum correlation value at subpixel level in step S48 might be found with several methods, for instance with interpolation. Since interpolation is well known in the art it will not be further described herein. The X fractional pixel position, $X_{FRAC}$, and the Y fractional pixel position, $Y_{FRAC}$, are also updated in step S48. The values are updated to the fractional pixel position $X_{FRAC}$, $Y_{FRAC}$ where the correlation has its maximum. In a next step S49 a counter j is set to j+1. The steps S46 to S49 are then repeated a predetermined number of times. For each time steps S46 to S49 are preformed a higher correlation value $C_i$ is found and the fractional pixel positions associated with that correlation value. The predetermined number of times for repeating steps S46 to S49 can be set to many different values. If the steps S46 to S49 are repeated many times a more accurate value of the correlation $C_i$ may be achieved. On the other hand is a longer calculation time required if steps S46 to S49 are repeated many times.

In a next step S50 is a counter i set to i+1. The steps S45 to step S50 are then repeated a predetermined number of times. A new scale factor is used each time the method executes steps S45 to S50. The new scale factor can be selected in many different ways. One way is to select the new scale using the half interval method. The half interval method is well known in the art and will therefore not be further described herein. Each time the method performs steps S45 to S50 is thus a maximum correlation value $C_i$ for a scale factor $S_i$ calculated. Next in a step S51 is a largest maximum correlation value $C_{MAX}$ found among the maximum correlation values $C_i$ that was calculated each time the method performed steps S45 to S50. In the step S51 is also the scale factor $S_{i,MAX}$ associated with the largest maximum correlation $C_{MAX}$ found.

Finally the time to go is calculated in step S52 using the scale factor $S_{i,MAX}$ that was found in step S51. The Time To Go, TTG may be calculated as inversely proportional to the scale factor $S_{i,MAX}$. In other embodiments of the invention the time to go is calculated using formula (1) below:

$$TTG = S_{i,MAX} * (T_1 - T_0) / (1 - S_{i,MAX}); \quad (1)$$

In the method is thus correlation values calculated for several different scale factors. Each time the steps S45 to S50 are performed is a maximum correlation $C_i$ calculated for the scale factor $S_i$. In step S51 is the large maximum correlation value $C_{MAX}$ found among the correlation values $C_i$ and the scale factor $S_{i,MAX}$ associated with $C_{MAX}$ The resulting scale factor $S_{i,MAX}$ that best matches is then used in step S51 to calculate the time-to-go.

In embodiments of the method according to the present invention can also the size in an image of the intruding aerial vehicle or object be calculated. The size of the intruding aerial vehicle or object may according to embodiments of the invention be expressed as the number of pixels in the image. The size of the intruding aerial vehicle or object is then first estimated by using a gauss fitting method as will be described further down. When using the gauss fitting method it is assumed that the intruding aerial vehicle or object is gauss alike. The assumption works for intruding aerial vehicle or objects that are far away form the vehicle. Therefore the gauss fitting method is used as an initial estimate of the size of the intruding aerial vehicle or object. The initial object size is then updated based on the Scale factor $S_{i,MAX}$ that was found in step S51.

In the method is a Gauss function adapted to the size of the intruding aerial vehicle or object in an image. The gauss fitting method is a non-linear problem which is solved by using the Levenberg-Marquardt method. Since the Levenberg-Marquardt method is well known in the art it will not be further described herein. In embodiments of the invention is a Gaussian function that is minimized a function with the following parameters: A, X, Y, SX, and SY. The first parameter A is the amplitude of the gauss. The parameters SX and SY are the variances of the gauss along the X- and Y-dimension. The parameters X and Y are the mean value of each dimension of the gauss.

When calculating the size in an image of the intruding aerial vehicle or object using the Gaussian function a start value of the size of the intruding aerial vehicle or object is needed. In embodiments of the method according to the present invention is thus at least one initial size, $\sigma_{Xin}$, $\sigma_{Yin}$, of the object or aerial vehicle estimated, prior to step S52, in a step S51a (not shown). In step S51a the initial size, $\sigma_{Xin}$, $\sigma_{Yin}$, is estimated in an image n between $T_0$ and $T_1$ in the second sequence of images 211 from the detector. The initial size, $\sigma_{Xin}$, $\sigma_{Yin}$ in embodiments of the invention is estimated by the detector 202. The size estimate from the detector may origin from a scale pyramid which results in one of the following values 2, 4, 8, 16 or 32 pixels (width and height estimated separately). The size estimate from the detector is good enough as start parameter.

As mentioned above another parameter in the Gaussian function is the amplitude A. When minimizing the Gaussian function a initial value for the amplitude A is needed. According to embodiments of the method at least one initial amplitude, $A_{in}$, are therefore estimated by calculating a difference between a mean of a background and a mean of the intruding aerial vehicle or object in the image n in the third sequence of images between $T_0$ and $T_1$. The estimation of the initial amplitude, Ain, is calculated in a step S51b after the step of estimating an initial size. In embodiments of the invention is the mean of the background estimated by using peripheral parts of the image n i.e. corners of the image n. The intruding aerial vehicle object is in this embodiment then assumed to be located in the centre of the image n, i.e. in this embodiment the tracker always tries to centralize the intruding aerial vehicle object in the image n when tracking.

At least one size, $\sigma_{Xn}$, $\sigma_{Yn}$, in an image n of the intruding aerial vehicle or object is calculated in a step S51c by adapting a Gaussian $G_n$, function to the intruding aerial vehicle or object in the image n. The adaption of the Gaussian function $G_n$ is done so that an error between the Gaussian function, $G_n$, and the object in the image n in the third sequence of images between $T_0$ and $T_1$ is minimized. The initial amplitude $A_{in}$ and the initial size, $\sigma_{Xin}$, $\sigma_{Yin}$ are used as start parameters for the Gaussian function. Start values $X_{in}$ and $Y_{in}$ for the position of the Gaussian function are also needed. In embodiments of the invention is the location of the Gaussian function, i.e. the mean values X and Y assumed to me located in centre of the image n since the tracker in this embodiment centralizes intruding aerial vehicle of object in the image n. In this embodiment the start values $X_{in}$ and $Y_{in}$ are set to the centre of the image n.

In other embodiments of the invention are several sizes, $\sigma_{Xn}$, $\sigma_{Yn}$, from several images ... n−2, n−1, n filtered to achieve a filtered size, $\sigma_{XF}$, $\sigma_{YF}$. An advantage achieved by filtering several sizes $\sigma_{Xn}$, $\sigma_{Yn}$, from several images ... n−2, n−1, n is that a better estimate of the size of the aerial vehicle or object, the filtered size $\sigma_{XF}$, $\sigma_{YF}$, may be achieved.

As mentioned above the gauss fitting method gives a good estimate of the size in an image of the aerial vehicles or objects if the aerial vehicle of object is far away form the vehicle. When the aerial vehicle of object is far away from the vehicle the aerial vehicle or object is more gauss like than when the aerial vehicle or object is closer to the vehicle. During a closing scenario the aerial vehicle or object becomes more detailed and less gauss alike. The size of the aerial vehicle or object therefore needs to be estimated in another way at closer range.

The idea according to the present invention is therefore to use the time-to-go value calculated in step S52 for updating the size $\sigma_{Xn+1}$, $\sigma_{Yn+1}$ for consecutive images n+1. Since the time to go value calculated at a point of time $T_1$ is calculated using the scale factor $S_{i,\,MAX}$, the time to go value contains information about the scale change of the intruding aerial vehicle or object at the point of time $T_1$. If an image n+1 corresponds to the point of time $T_1$ then the time to go value for $T_1$ contains information about the scale change that can be used for updating the calculated size $\sigma_{Xn}$, $\sigma_{Yn}$ size in image n of the intruding aerial vehicle of object.

If the size of the intruding aerial vehicle or object in an image n is calculated in step S51c. The time to go value $TTG_{n+1}$ calculated for the image n+1 can be used for updating the size of the intruding aerial vehicle of object.

In order to update the size $\sigma_{Xn+1}$, $G_{Yn+1}$ based on the estimated time-to-go $TTG_{n+1}$ the following formulas may be used in a step S53 (not shown), after the step of calculating time to go.

$$\sigma_{Xn+1} = \sigma_{Xn}(TTG_{n+1} + 1/f)/TTG_{n+1} \quad (1)$$

$$\sigma_{Yn+1} = \sigma_{Yn}(TTG_{n+1} + 1/f)/TTG_{n+1} \quad (2)$$

Where $\sigma_{Yn}$, $\sigma_{Xn}$ is the size of the intruding aerial vehicle of object in the image n and f is the image frequency. In other embodiments of the invention is the filtered size $\sigma_{XF}$, $\sigma_{VF}$ used instead of the size $\sigma_{Xn}$, $\sigma_{Yn}$ when updating the size in step S53.

The invention claimed is:

1. A method for calculating a Time To Go, TTG, value between a vehicle and an intruding object, said method comprising:
    retrieving a first image of said intruding object at a first point of time, $T_0$, and a second image of said intruding object at a second point of time, $T_1$;
    selecting a scaling factor S, and scaling said second image with said scale factor, $S_i$;
    resampling said scaled image to a set position $X_{FRAC}$, $Y_{FRAC}$ resulting in a resampled scaled image, $RS_iI$;
    calculating correlation values, $C_{XPIX,\,YPIX,\,i}$, between said first image and said resampled scaled image, $RS_iI$, for different horizontal displacements $X_{PIX}$ and/or different vertical displacements $Y_{PIX}$ for said resampled scaled image $RS_iI$;
    finding a maximum correlation value $C_i$ based on said correlation values, $C_{XPIX,\,YPIX\,i}$;
    repeating the selecting the scaling factor, wherein i=i+1, the resampling, calculating the correlation values, and finding the maximum correlation values a second predetermined number of times;
    finding a largest maximum correlation value, $C_{MAX}$, among said maximum correlation values, $C_i$, and the scale factor $S_{i,\,MAX}$ associated with the largest maximum correlation value $C_{MAX}$; and
    calculating the Time To Go, TTG, based on said scale factor $S_{i,\,MAX}$ associated with the largest maximum correlation value $C_{MAX}$.

2. The method for calculating a Time To Go, TTG, value according to claim 1, further comprising:
    a first iteration performed for each selected scaling factor S, for a predetermined number of different set positions $X_{FRAC}$; $Y_{FRAC}$; and
    repeating the resampling, the correlation value calculating, and finding the maximum correlation a first predetermined number of times corresponding to the predetermined number of different set positions.

3. The method according to claim 1, wherein each set position $X_{FRAC}$, $Y_{FRAC}$ denotes at least one of a horizontal displacement at sub pixel level or a vertical displacement at sub pixel level.

4. The method according to claim 3, further comprising:
    initially setting the X fractional pixel position, $X_{FRAC}$, to zero and the Y fractional pixel position, $Y_{FRAC}$, to zero.

5. The method according to claim 1, further comprising:
    filtering said first image and said second image so that said first image and said second image become independent of absolute signal energy and/or so that edges become enhanced.

6. The method according to claim 1, wherein the Time To Go, TTG is calculated as inversely proportional to the scale factor $S_{i,\,MAX}$.

7. The method according to claim 1, wherein the Time To Go, TTG is calculated using the formula:

$$TTG = S_{i,\,MAX} * (T_1 - T_0)/(1 - S_{i,\,MAX}).$$

8. The method according claim 1, further comprising:
    prior to said retrieving, detecting said object in a first sequence of images from a camera creating a second sequence of images in which images are associated with information about detected objects, wherein said retrieving comprises retrieving said first and said second images from the second sequence of images.

9. The method according to claim 1, further comprising:
    prior to said retrieving, detecting said object in a first sequence of images from a camera creating a second sequence of images in which each images are associated with information about detected objects; and
    after said detecting, tracking said object in said second sequence of images, creating a third sequence of images in which said object is centralized in the images, wherein said retrieving comprises retrieving said first image and said second image from the third sequence of images.

10. The method according to claim 8, further comprising:
    prior to said calculating the Time To Go, TTG, estimating at least one initial size, $\sigma_{Xin}$, $\sigma_{Yin}$, of said object in an image n in said second sequence of images between $T_0$ and $T_1$.

11. The method according to claim 10, further comprising:
    estimating at least one initial amplitude, $A_{in}$, after estimating an initial size, of a Gauss function by calculating a difference between a mean of a background and a mean of said object in said image n in the third sequence of images between $T_0$ and $T_1$.

12. The method according to claim 11, further comprising:
    calculating at least one size, $\sigma_{Xn}$, $\sigma_{Yn}$, after said estimating an initial amplitude, by determining a Gaussian function, $G_n$, so that an error between said Gaussian function, $G_n$, and said object in said image n in the third sequence of images between $T_0$ and $T_1$ is minimized, wherein said initial amplitude $A_{in}$ and said initial size, $\sigma_{Xin}$, $\sigma_{Yin}$ are used as start parameters for said Gaussian function.

13. The method according to claim 12, wherein calculating a size further comprises filtering several sizes, $\sigma_{Xn}$, $\sigma_{Yn}$, from several images and thereby achieving a filtered size, $\sigma_{XF}$, $\sigma_{YF}$.

14. The method according to claim 12, further comprising:
updating said size $\sigma_{Xn+1}, \sigma_{Yn+1}$ for consecutive images n+1 in said third sequence based on said size $\sigma_{Xn}, \sigma_{Yn}$ in said image n by using formulas:

$$=\sigma_{Xn+1}=\sigma_{Xn}(TTG_{n+1}+1/f)/TTG_{n+1}$$

$$\sigma_{Yn+1}=\sigma_{Yn}(TTG_{n+1}+1/f)/TTG_{n+1},$$

where f is an image frequency between consecutive images.

15. The method according to claim 14, wherein updating the size said filtered size comprises utilizing, σXF, σYF, as start value.

16. A computer program product for use in a vehicle for calculating a Time To Go, TTG, between said vehicle and an intruding object, the computer program product comprising:
   a non-transitory computer readable medium; and
   computer readable code recorded on the non-transitory computer readable medium, which, when run in a processor of the vehicle causes the processor to perform a method comprising retrieving a first image of said intruding object at a first point of time, $T_0$, and a second image of said intruding object at a second point of time, $T_1$,
   selecting a scaling factor S, and scaling said second image with said scale factor, $S_i$,
   resampling said scaled image to a set position $X_{FRAC}$, $Y_{FRAC}$ resulting in a resampled scaled image, $RS_iI$;
   calculating correlation values, $C_{XPIX, YPIX, i}$, between said first image and said resampled scaled image, $RS_iI$, for different horizontal displacements $X_{PIX}$ and/or different vertical displacements $X_{PIX}$ for said resampled scaled image $RS_iI$,
   finding a maximum correlation value $C_i$ based on said correlation values, $C_{XPIX, YPIX i}$,
   repeating selecting the scaling factor, wherein i=i+1, the resampling, calculating the correlation values, and finding the maximum correlation a second predetermined number of times,
   finding a largest maximum correlation value, $C_{MAX}$, among said maximum correlation values, $C_i$, and the scale factor $S_{i, MAX}$ associated with the largest maximum correlation value $C_{MAX}$, and
   calculating the Time To Go, TTG, based on said scale factor $S_{i, MAX}$ associated with the largest maximum correlation value $C_{MAX}$.

17. The computer program product according to claim 16, wherein the computer readable code further causes the processor to perform a first iteration for each selected scaling factor $S_i$ for a predetermined number of different set positions $X_{FRAC}, Y_{FRAC}$, and repeat the resampling, the correlation value calculating, and finding the maximum correlation a first predetermined number of times corresponding to the predetermined number of different set positions.

18. The computer program product according to claim 16, wherein each set position $X_{FRAC}, Y_{FRAC}$ denotes a horizontal displacement at sub pixel level and/or a vertical displacement at sub pixel level.

19. The computer program product according to claim 18, wherein the computer readable code further causes the processor to initially set the X fractional pixel position, $X_{FRAC}$, to zero and the Y fractional pixel position, $Y_{FRAC}$, to zero.

20. The computer program product according to claim 16, wherein the computer readable code further causes the processor to filter said first image and said second image so that said first image and said second image become independent of absolute signal energy and/or so that edges become enhanced.

21. The computer program product according to claim 16, wherein the Time To Go, TTG is calculated as inversely proportional to the scale factor $S_{i,MAX}$.

22. The computer program product according to claim 16, wherein the Time To Go, TTG is calculated using the formula:

$$TTG=S_{i, MAX}*(T_1-T_0)/(1-S_{i, MAX}).$$

23. The computer program product according to claim 16, wherein said computer readable code further causes the processor to perform prior to said retrieving
   detecting said object in a first sequence of images from a camera creating a second sequence of images in which images are associated with information about detected objects, wherein said retrieving further comprises retrieving said first and said second images from the second sequence of images.

24. A system for calculating a Time To Go, TTG, value between a vehicle and an intruding object, said system comprising:
   a memory module comprising a computer program product comprising
      computer readable code recorded on the memory module, which, when run in a processor of the vehicle causes the processor to perform a method comprising
      retrieving a first image of said intruding object at a first point of time, $T_0$, and a second image of said intruding object at a second point of time, $T_1$,
      selecting a scaling factor S, and scaling said second image with said scale factor, $S_i$,
      resampling said scaled image to a set position $X_{FRAC}$, $Y_{FRAC}$ resulting in a resampled scaled image, $RS_iI$;
      calculating correlation values, $C_{XPIX, YPIX, i}$, between said first image and said resampled scaled image, $RS_iI$, for different horizontal displacements $X_{PIX}$ and/or different vertical displacements $Y_{PIX}$ for said resampled scaled image $RS_iI$,
      finding a maximum correlation value $C_i$ based on said correlation values, $C_{XPIX, YPIX i}$,
      repeating selecting the scaling factor, wherein i=i+1, the resampling, calculating the correlation values, and finding the maximum correlation a second predetermined number of times,
      finding a largest maximum correlation value, $C_{MAX}$, among said maximum correlation values, $C_i$, and the scale factor $S_{i, MAX}$ associated with the largest maximum correlation value $C_{MAX}$, and
      calculating the Time To Go, TTG, based on said scale factor $S_{i, MAX}$ associated with the largest maximum correlation value $C_{MAX}$; and
   a processor configured to run said computer program product.

* * * * *